(12) United States Patent
King

(45) Date of Patent: May 26, 2009
(10) Patent No.: US 7,538,655 B1

(54) INTERACTIVE WIRELESS VEHICLE IMMOBILIZER

(76) Inventor: Kevin M. King, 13641 E. Shaw Butte Dr., Scottsdale, AZ (US) 85259

( * ) Notice: Subject to any disclaimer, the term of this patent is extended or adjusted under 35 U.S.C. 154(b) by 639 days.

(21) Appl. No.: 11/415,908

(22) Filed: May 2, 2006

(51) Int. Cl.
G06F 7/04 (2006.01)

(52) U.S. Cl. .................. 340/5.51; 340/5.1; 340/5.28; 340/5.6; 340/5.61; 307/9.1; 307/10.1

(58) Field of Classification Search ............ 340/426.11, 340/426.12, 426.13, 426.17, 825.36, 825.37, 340/5.31, 5.72, 5.64, 5.4–5.42, 5.85, 5.51, 340/5.54; 307/9.1, 10.1–10.6
See application file for complete search history.

(56) References Cited

U.S. PATENT DOCUMENTS

| | | | |
|---|---|---|---|
| 4,754,255 A * | 6/1988 | Sanders et al. ............. 307/10.4 |
| 5,276,728 A * | 1/1994 | Pagliaroli et al. ........ 455/404.1 |
| 5,510,780 A | 4/1996 | Norris et al. | |
| 5,623,245 A * | 4/1997 | Gilmore ............... 340/426.12 |
| 5,874,889 A * | 2/1999 | Higdon et al. ......... 340/426.36 |
| 6,195,648 B1 | 2/2001 | Simon et al. | |
| 6,225,890 B1 * | 5/2001 | Murphy ................. 340/426.19 |
| 6,828,692 B2 | 12/2004 | Simon | |
| 2005/0242971 A1 * | 11/2005 | Dryer .................... 340/870.11 |
| 2007/0194881 A1 * | 8/2007 | Schwarz et al. ........... 340/5.31 |

OTHER PUBLICATIONS

Kevin M. King, Convergent Wireless KRONOS Business Model Presentation (Powerpoint Presentation Slides), confidential presentation given Sep. 24, 2004.

* cited by examiner

Primary Examiner—Daniel Wu
Assistant Examiner—Ryan W Sherwin
(74) Attorney, Agent, or Firm—Camille L. Urban; G. Brian Pingel

(57) ABSTRACT

The present invention is a time-based vehicle immobilizer useful for lenders. The Immobilizer has a base unit attached to the starter circuit of a vehicle and a wireless handheld unit. The base unit disables the vehicle starter circuit unless it receives a signal indicating a period of time from the handled unit. The handheld unit will only generate a signal if an activation code entered into a keypad on the unit corresponds to a reference code stored in the unit's memory. Each preloaded reference code represents a period of time and is deleted after matching with an activation code. When no amount of time remains on the base unit, the vehicle is immobilized at the next ignition attempt.

30 Claims, 5 Drawing Sheets

INTERACTIVE WIRELESS VEHICLE IMMOBILIZER

BACKGROUND OF THE INVENTION

1. Field of the Invention

The present invention relates in general to vehicle immobilizers, specifically a system for disabling a vehicle at the end of a vehicle payment plan.

2. Description of Related Art

Vehicle immobilizer systems for motor vehicles are well known as a means to prevent theft and improve safety. Installing a time based vehicle immobilizer provides vehicle dealers and lenders with a method for reducing their risk in offering credit to high risk consumers. Time based immobilizers not only lower the cost of repossession, they also remind borrowers to make timely payments and can result in long term behavior changes.

U.S. Pat. No. 6,195,648 discloses a vehicle immobilizing system that disables a vehicle ignition system unless a correct code is entered prior to a payment due deadline. This system allows lenders to distribute codes only after a payment is received. This system requires determining a payment due deadline for each code, allowing only one correct code for each payment period. A similar device, U.S. Pat. No. 5,510,780, discloses a vehicle activation control system that also relies on a clock means to determine whether the correct code has been entered. This system also requires codes to be entered in the proper sequence.

The present invention differs from the above referenced inventions and other similar devices in that these prior devices require computation of a payment due date and codes that correspond to the payment due date. These prior devices do not account for payment grace periods or accommodation of state "Right-to-Cure" laws. The prior devices also immobilize vehicles without regard to whether the vehicle is in operation.

SUMMARY

The present invention provides a vehicle immobilizer having a base unit and a handheld unit. The base unit has a relay connected to a vehicle starter circuit that is capable of disabling the circuit to immobilize the vehicle. Immobilization is dependent on whether the base unit is counting increments of time as directed by the handheld unit. The handheld unit stores reference code representing a number of increments of time and will direct the base unit through wireless communication to count those increments upon entry of an activation code that corresponds to the reference code.

The base unit and handheld unit each have a microprocessor, memory, and a transceiver. The base unit further has a piezoelectric buzzer to warn of vehicle immobilization and an accessory input sensor to sense accessory off or key in accessory position. The vehicle is only immobilized when the accessory input is in the key in accessory position and not during operation. In an alternative embodiment immobilization is allowed only after the accessory input is in the accessory off position for more than one hour. The handheld unit further has a keypad for input of activation codes. A liquid crystal display (LCD) and light emitting diodes (LEDs) on the handheld unit provide a user interface and display time remaining before immobilization.

Reference codes are pregenerated and stored on the handheld unit memory in the preferred embodiment. Activation codes corresponding to the reference codes are also pregenerated and entered into the keypad in the preferred embodiment. The codes are compared and if the microprocessor determines that they correspond, the handheld unit will provide the increments of time represented by the reference code to the base unit and remove the reference code from memory.

The codes can represent any amount of time, such as payment periods. The immobilizer is well suited for lenders and in the preferred method lenders are provided activation codes to provide to debtors upon receipt of payment. To aid in repayment, the immobilizer includes a built-in grace period. Alternative embodiments include the use of emergency codes reusable during billing periods for brief emergency use of a the vehicle, counting of a lapsed time between counting of increments to and deduction of lapsed time from the increments to be counted, and a calendar mode to adjust the increments to fit within monthly periods.

An object of the present invention is to provide lenders with a vehicle immobilizer that is easy to use with customizable payment plans.

Another object of the present invention is to provide debtors using vehicles with installed immobilizers an easy-to-use interface and flexible payment options.

A further object of the present invention is to provide a vehicle immobilizer that will not immobilize a vehicle during operation or otherwise compromise vehicular safety.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DESCRIPTION OF THE PREFERRED EMBODIMENT(S)

Figure 1:
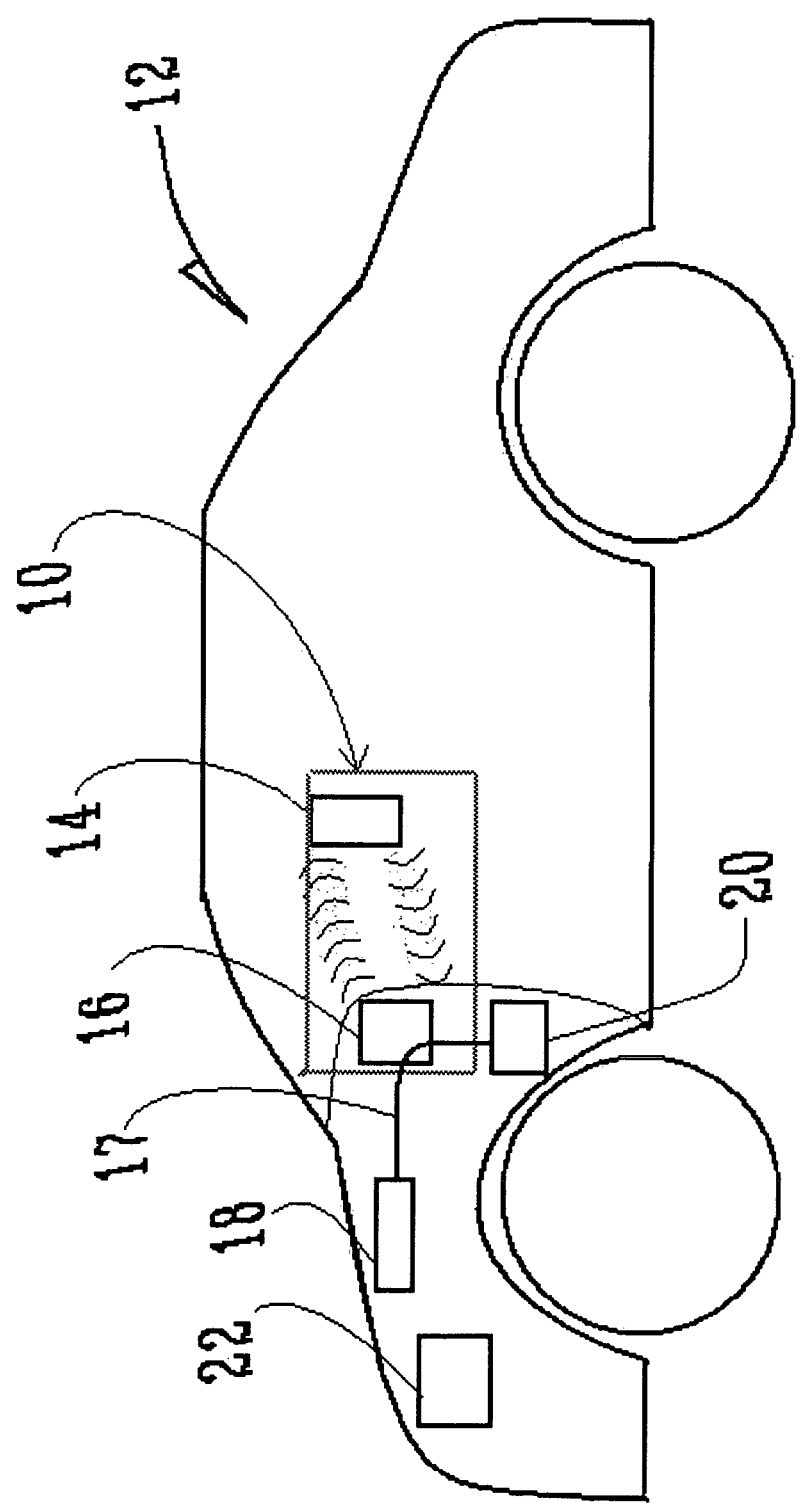
FIG. 1 is a plan of the preferred embodiment of the present invention of a vehicle immobilizer installed in a vehicle.

The preferred embodiment of the present invention of a vehicle immobilizer 10 for immobilizing a vehicle 12 is shown in FIG. 1. The immobilizer has a handheld unit 14 and a base unit 16. As seen in FIG. 1, the base unit 16 is connected to a starter circuit 17 between a starter 18 of the vehicle 12 and an ignition 20 of the vehicle 12. The base unit 16 is immobilizes the vehicle 12 by disabling the starter circuit 17 to prevent the ignition 20 from activating the starter 18. The base unit derives its power from a battery 22 of the vehicle 12. The preferred embodiment of the base unit 16 draws only trace amounts of power when the vehicle 12 is not in operation. The base unit 16 is preferably mounted in vehicle 16 so as to be inaccessible. The handheld unit 14 powers itself and is preferably not attached to vehicle 12.

In addition to immobilizing the vehicle 12, the base unit 16 keeps track of a period of time by counting increments of time. While counting the increments, the base unit 16 does not immobilize the vehicle 12. After the increments have been counted, i.e. the period of time has passed, the base unit 16 immobilizes the vehicle 12.

Figure 2:
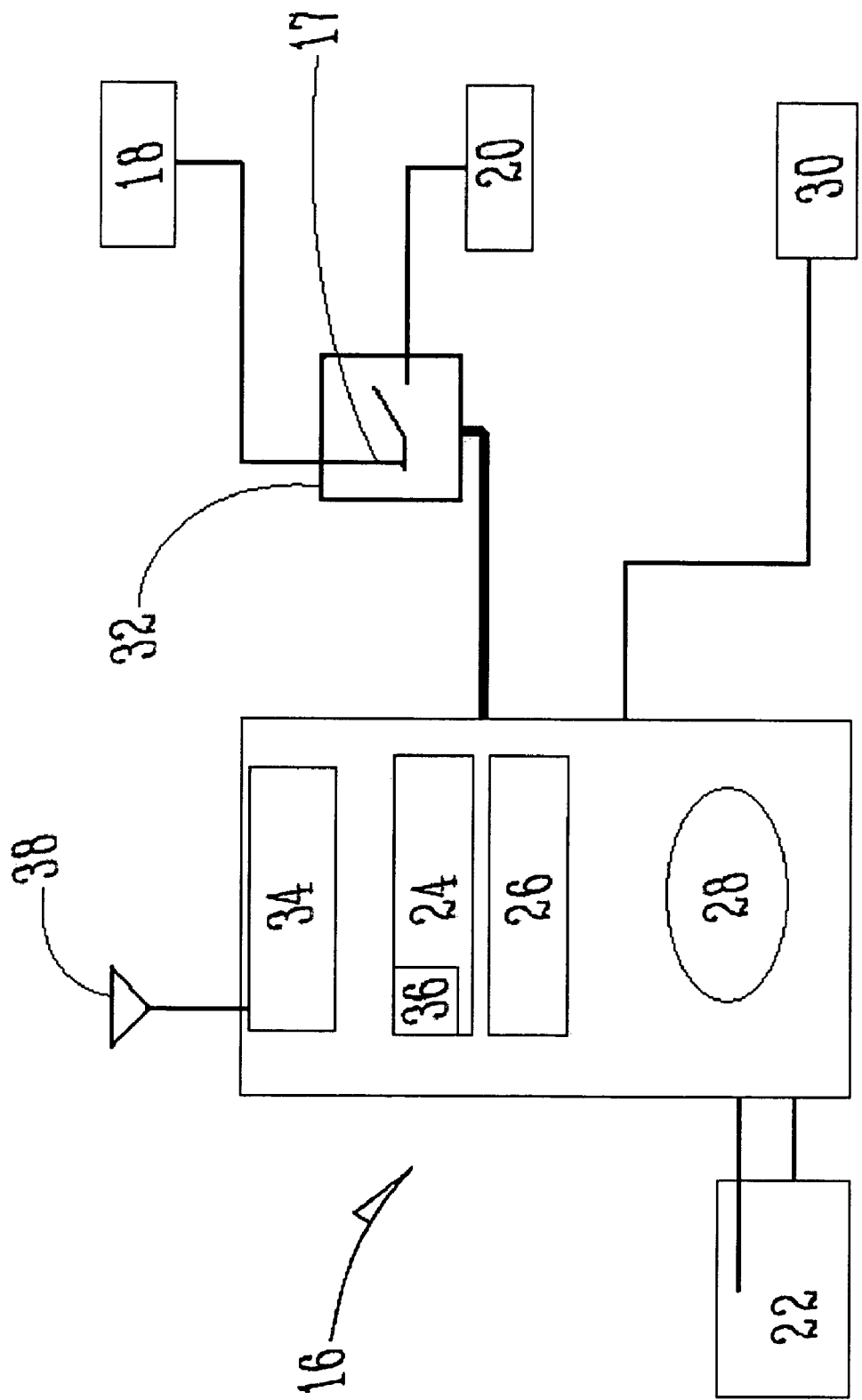
FIG. 2 is a plan of a base unit of the preferred embodiment of the present invention.
Figure 3:
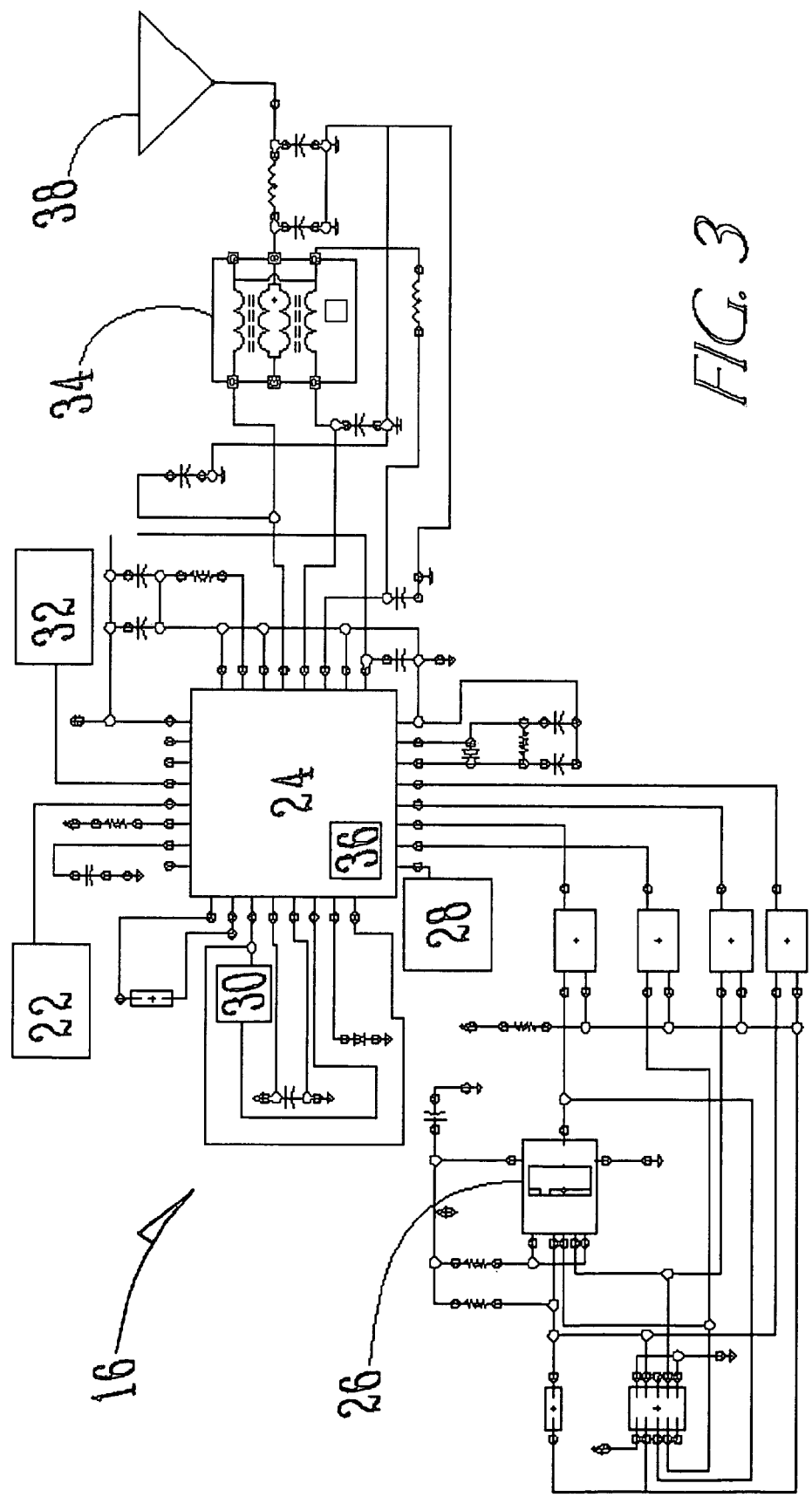
FIG. 3 is a schematic of the base unit of FIG. 2.

As seen in FIGS. 2 and 3, the preferred embodiment of base unit 16 has a microprocessor 24, flash memory 26, a piezo-electric buzzer 28, an accessory input sensor 30, a relay 32, and a transceiver 34. The microprocessor 24 counts the increments using an oscillator based crystal interrupt counter 36. The counter 36 counts at 50 ms increments in the preferred embodiment. In the preferred embodiment the base unit memory 26 is usable for setting a checkpoint of time counted when counting is interrupted, for instance, when the base unit loses power.

The accessory input sensor 30 senses key in accessory position and accessory off position. Accessory off position occurs when the vehicle 12 is not in operation and key in accessory occurs before activation of the vehicle ignition 20. When the accessory input sensor 30 senses key in accessory position, the starter 18 is not activated but the vehicle 12 draws power from the battery 22 for operation of powered vehicle devices known in the art such as vehicle windows, a vehicle radio, and a vehicle climate control system (not shown). When the accessory input sensor 30 senses key in accessory position, the microprocessor 24 determines whether time remains to be counted. If no time remains to be counted, the microprocessor 24 activates the relay 32 to disable the starter circuit 17. If time does remain to be counted, the relay 32 does not disable the starter circuit. By determining whether to immobilize the vehicle 12 at pre-ignition status, the immobilizer 10 prevents immobilization during operation of the vehicle 12. When the microprocessor 24 determines that no increments remain to be counted in key in accessory position in the preferred embodiment, the microprocessor 24 will activate the piezoelectric buzzer 28 to provide an audible indication that the vehicle 12 will be or has been immobilized.

As an additional safety feature in an alternative embodiment, the accessory input sensor 30 monitors key in accessory position and accessory off position to prevent immobilization of the vehicle 12 during operation of the vehicle 12 and within a fixed time after operation of the vehicle 12. Immobilization in the preferred alternative embodiment is allowed only after the accessory input sensor 30 senses accessory off position for greater than one hour. Normal vehicle operation can thus continue before immobilization. This safety feature also prevents immobilization after such events as momentary stalling of the vehicle 12, stops due to road emergencies, and stops initiated by law enforcement.

The base unit 16 of the present invention must receive the number of increments to count via the transceiver 34. In the preferred embodiment, the transceiver 34 is a radio transceiver and has a radio antenna 38. The radio transceiver 34 is advantageous because it allows the base unit 16 to be inaccessible but still able to communicate with the handheld unit 14. However, the transceiver 34 may use infrared light to communicate.

Figure 4:
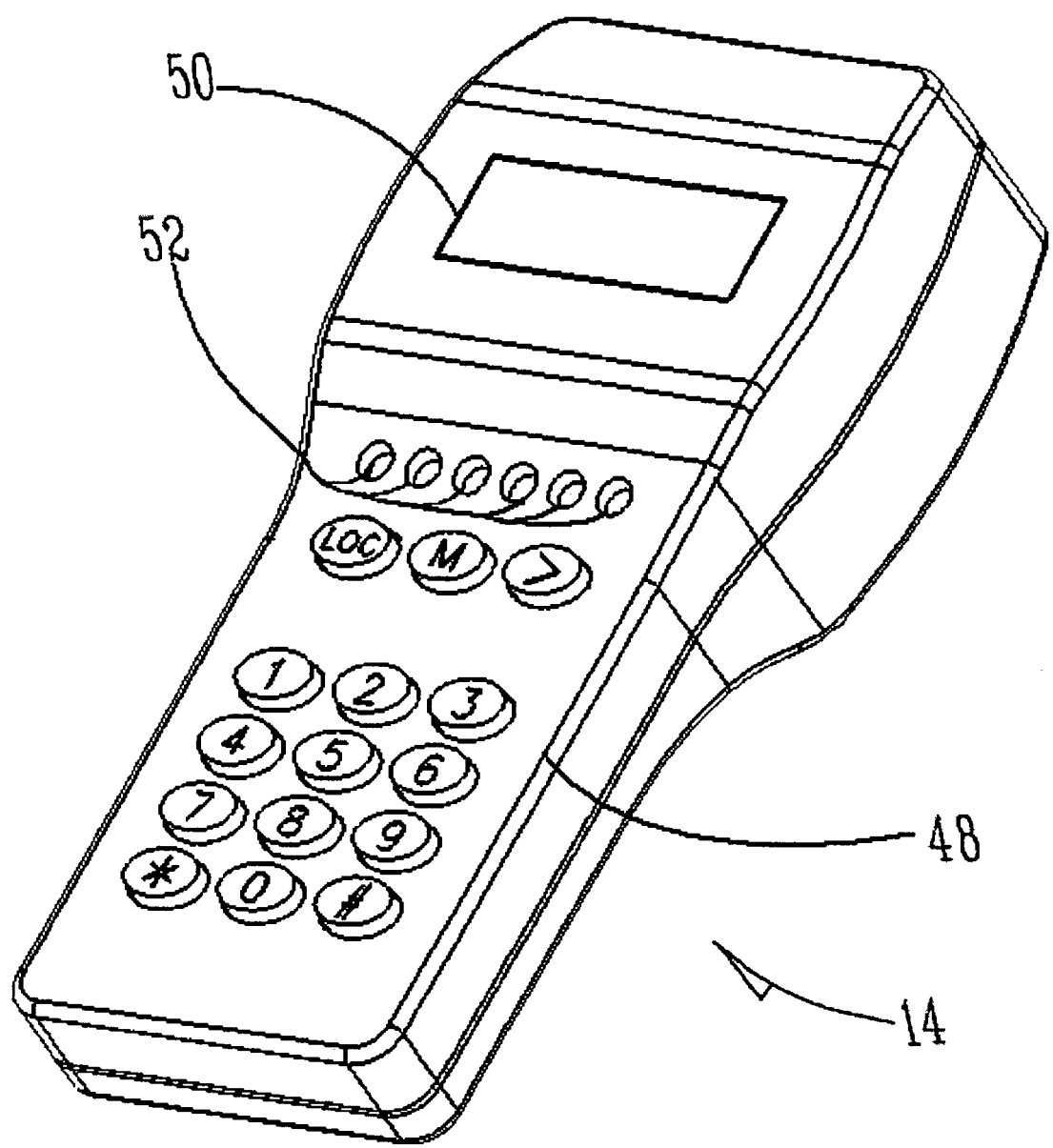
FIG. 4 is a perspective view of the handheld unit of the preferred embodiment of the present invention.
Figure 5:
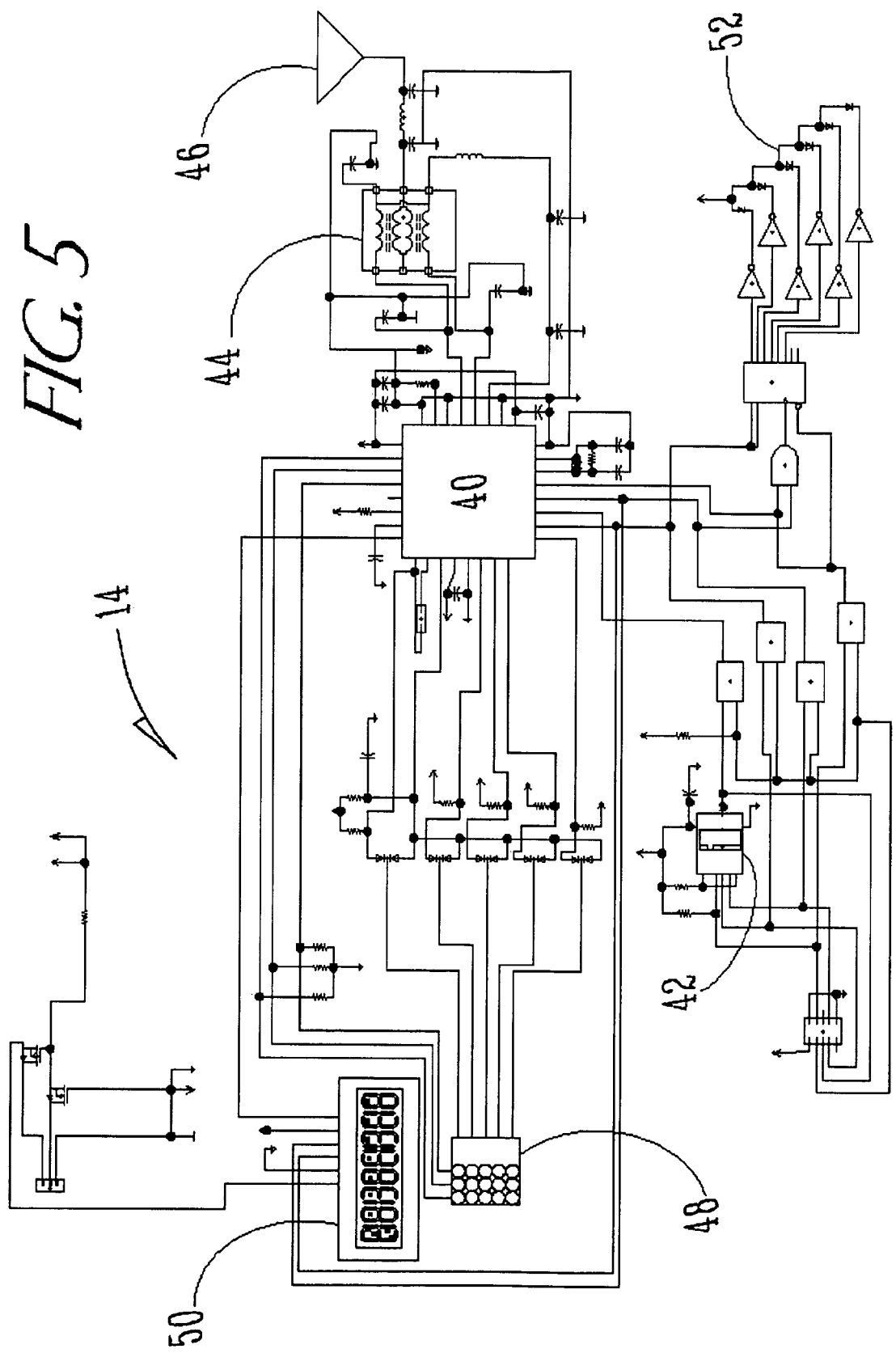
FIG. 5 is a schematic of a handheld unit of FIG. 4.

The handheld unit 14 shown in FIGS. 4 and 5 has its own microprocessor 40, flash memory 42 serving as electronic storage means, and transceiver 44 as indicated in FIG. 5. The transceiver 44 of the handheld unit 14 of the preferred embodiment is also a radio transceiver with antenna 46. The handled unit transceiver 44 may also use infrared light to communicate so long as the base unit transceiver 34 also uses infrared light to communicate.

The handheld unit memory 42 stores a plurality of reference codes. Each reference code corresponds to a number of increments representing a period of time. In the preferred embodiment, the handheld unit memory 42 stores five years worth of reference codes corresponding to hours, days, weeks, and months. Each reference code has a corresponding activation code. Activation codes are not stored in the handheld unit memory 42, but instead are manually entered via a keypad 48, serving as a means for entry of an activation code. The handheld unit microprocessor 40 compares the entered activation code to the stored reference codes, and if a corresponding reference code is found, the handheld unit microprocessor 40 will activate the handheld unit transceiver 44 and cause the transceiver 44 to send a signal to the base unit 16. The signal carries with it the number of increments represented by the reference code that corresponded to the activation code.

In an alternative embodiment, some the reference codes are emergency codes corresponding to shortened periods of time. The handheld unit 14 monitors a cycling period of time in which emergency codes may be entered. Unlike reference codes, the emergency codes are not deleted or flagged for non-use after a match is found with a corresponding activation code. Instead, the emergency codes are temporarily flagged for non-use until the next cycling period of time. In the preferred alternative embodiment, the cycling period is a billing period and the emergency codes represent periods of time of one hour or half hour. The emergency codes thus allow use of a vehicle even when no increments of time remain to be counted for such purposes as responding to an emergency, making payments, or returning the vehicle 12 to a lender.

The handheld unit 14 also has an LCD 50 and a plurality of LEDs 52 as further shown in FIG. 4. The LCD 50 and LEDs 52 provide a user interface to aid in the entry of activation codes and can display the amount of time remaining to be counted. The LEDs of the preferred embodiment are colored green, yellow, and red from left to right. When the counting of increments begins the leftmost green LED is illuminated and the LEDs farther right are illuminated progressively as the period of time passes until no time remains. Although the preferred embodiment of the handheld unit 14 has the same ability to count increments of time as the base unit 16, the handheld unit 14 may not accurately reflect the amount of increments remaining to be counted by the base unit, but is sufficient to forewarn of vehicle immobilization. In an alternative embodiment, the base unit constantly sends a signal, preferably only during operation of the vehicle 12 so as not to drain the battery 22, to the handheld unit 14, with the remaining time to be counted.

The preferred method of the present invention is to utilize the immobilizer 10 to immobilize the vehicle 12 after a set of amount of time such as a payment period. The preferred method begins with the generation of reference codes representing a number of increments that represent a period of time. An activation code corresponding to each reference code is also generated. It is essential that each activation code correspond to only one reference code and vice versa. The reference codes are then stored in the handheld unit memory 42. The reference code is provided to the handheld unit microprocessor 40 via the memory 42 and the activation code is provided to the microprocessor 40 via the keypad 48 of the preferred embodiment, but the method of the present invention is not limited to the preferred means of providing an activation code. The microprocessor 40, serving as a microprocessor, determines whether the activation code corresponds to any of the stored reference codes. If the activation code does correspond to a reference code then the number of increments representing a period of time are counted and the reference code is removed from the memory 42.

In the preferred embodiment, the increments are 50 milliseconds and are counted by the base unit 16. When all of the increments have been counted, the base unit 16 disables the vehicle starter circuit 17. In the preferred embodiment, the vehicle 12 is never disabled while in operation, but instead the vehicle 12 is disabled upon pre-ignition status.

In an alternative embodiment the base unit 16 also counts a lapsed time beginning when no increments remain to be counted and ending when the handheld unit 14 sends the signal with increments of time to be counted. The lapsed time is then subtracted from the newly sent increments to be counted. This alternative embodiment is useful for when a dealer has contracted for consecutive periods of vehicle use. The lapsed time deduction penalizes a debtor for non-payment and prevents use of the vehicle 12 outside of the contracted period.

In another alternative embodiment, the base unit 16 includes a calendar mode to keep track of days and months and adjusts the increments to be counted consistent with calendar days and months. For instance, most billing periods are monthly but months have different numbers of days. With the calendar mode, the base unit adjusts the increments by addition or subtraction of a day's worth of increments to fit within the month in which the increments are counted. Using this feature the lender need not select activation codes based on a specific number of days or consider events such as leap years.

One of the intended uses of the method of the present invention is asset protection for lenders. This embodiment of the preferred method includes the step of providing activation codes to a lender or in an alternative method the lender can be provided reference codes and a means to generate activation codes. The lender then must provide the activation code to a debtor for entry into the keypad 48 or provide activation codes to the handheld unit through another means such as wireless communication.

Because each reference code represents a number of increments representing a period of time, the lender has the flexibility to provide activation codes corresponding to reference codes that are substantially similar or identical to loan repayment periods. For example, if payments are due monthly, the lender can select codes that represent one month periods. However, if the lender wishes to provide codes representing different time periods, such as days or weeks, the lender need only select the code representing the desired time period. Codes representing short durations, such as an hour, can be provided by the lender for emergency situations after immobilization or when repossessing an immobilized vehicle. Because the entry of corresponding codes adds increments of time, the lender can also provide multiple activation codes for debtors making multiple payments in advance.

The preferred method also includes several steps that aid in repayment of debt obligations. When increments of time are counted, an indicator provides indication of time remaining. In the preferred embodiment the piezoelectric buzzer 28, LCD 50, and LEDs 52 indicate time remaining. The preferred embodiment also includes a built in programmable grace period. It is preferred that for monthly time periods, a grace period of several days would be added after the increments of time has been counted. The grace period gives the lender sufficient time to make a payment and receive another activation code before immobilization of the vehicle 12. The grace period automatically ends when more increments are added to the base unit 16 to be counted.

Thus, the present invention has been described in an illustrative manner. It is to be understood that the terminology that has been used is intended to be in the nature of words of description rather than of limitation.

Many modifications and variations of the present invention are possible in light of the above teachings. For example, the memory 42 can be of any size and can store any number of reference codes. Therefore, within the scope of the appended claims, the present invention may be practiced otherwise than as specifically described.

What I claim is:

1. An apparatus for immobilizing a vehicle having a vehicle battery, a starter, an ignition, and a starter circuit, said apparatus comprising:

a handheld unit including a microprocessor, electronic storage means for storing a plurality of reference codes, each of said reference codes representing a period of time, a means for entry of a plurality of activation codes, and a user interface, said microprocessor is capable of determining whether any of said activation codes correctly corresponds to any of said reference codes;

said electronic storage means being non-permanent to allow deletion of any of said reference codes determined by said microprocessor to correctly correspond to any of said activation codes;

a base unit mounted to said vehicle and having a means for counting said period of time in increments and a means for deactivating said starter circuit to immobilize said vehicle;

means for wireless communication in each of said handheld unit and said base unit such that said handheld unit communicates a signal to said base unit if said microprocessor determines that said activation code correctly corresponds to said reference code and conveying said period of time from said handheld unit to said base unit; and said means for immobilizing said vehicle activates to immobilize said vehicle when said means for counting counts all of said period of time.

2. The apparatus of claim 1 wherein at least one of said reference codes is a reusable emergency code corresponding to a shortened period of time, said handheld unit monitors a cycling period of time and reactivating said emergency code upon a new cycle period.

3. The apparatus of claim 1 wherein said means for immobilizing said vehicle is a relay in said starter circuit between said ignition and said starter.

4. The apparatus of claim 3 wherein said electronic storage means is flash memory.

5. The apparatus of claim 4 wherein said means for data entry includes a keypad.

6. The apparatus of claim 5 wherein said means for data entry further includes a means for wireless telecommunication.

7. The apparatus of claim 5 wherein said user interface includes liquid crystal display (LCD).

8. The apparatus of claim 5 wherein said handheld unit includes a plurality of light emitting diodes (LEDs) representing said period of time counted.

9. The apparatus of claim 8 wherein said plurality of LEDs includes at least three LEDs of the colors green, yellow, and red representing substantially all of said period of time remaining, less than substantially all of said period of time remaining, and none of said period of time remaining, respectively.

10. The apparatus of claim 4 wherein said means for wireless communication is a radio frequency (RF) transceiver.

11. The apparatus of claim 4 wherein said base unit includes a piezoelectric buzzer producing an audible signal upon activation of said vehicle ignition when none of said increments remain to be counted.

12. The apparatus of claim 11 wherein said piezoelectric buzzer produces a first audible signal when substantially all of said increments of time remain to be counted, a second audible signal when less than substantially all of said increments remain to be counted, and a third audible signal when none of said increments remain to be counted, respectively.

13. The apparatus of claim 4 wherein said means for counting is an oscillator based crystal interrupt counter and said period of time is counted in 50 millisecond increments.

14. The apparatus of claim 4 wherein said base unit includes flash memory for providing a checkpoint of said period of time counted such that said checkpoint is set when said base unit loses power and counting can resume from said checkpoint when power is restored.

15. The apparatus of claim 4 wherein said base unit counts a lapsed time beginning when all of said increments have been counted and stopping when said activation code matches said reference code thereby conveying said period of time corresponding to said reference code, said period of time thereafter reduced by subtracting said lapsed time.

16. The apparatus of claim 15 wherein said base unit has a calendar mode capable of keeping track of calendar days and months and said period of time is adjusted by subtracting or adding increments based on calendar events.

17. The apparatus of claim 16 wherein said calendar event is every month and said period of time is adjusted to correspond to any month in which the period of time is counted regardless of the number of days of each month.

18. The apparatus of claim 4 wherein said base unit further includes an input accessory sensor for monitoring accessory input in either key in accessory position or accessory off position and said base unit only activates said relay after all of said increments have been counted and said accessory input is in said key in accessory position.

19. The apparatus of claim 18 wherein said base unit further activates said relay only after counting of an immobilization delay time, said base unit begins counting said immobilization delay time when said accessory input is in said accessory off position.

20. The apparatus of claim 19 wherein said base unit resets said immobilization delay time when during said counting of said immobilization delay time said accessory input sensor senses said key in accessory position.

21. The apparatus of claim 20 wherein said immobilization delay time is one hour.

22. An apparatus for immobilizing a vehicle having a vehicle battery, a starter, an ignition, and a starter circuit, said apparatus comprising:
  a handheld unit including a microprocessor, flash memory for storing a plurality of reference codes, a keypad for entry of a plurality of activation codes, and an LCD display, said microprocessor is capable of determining whether any of said activation codes correctly corresponds to any of said reference codes;
  each of said reference codes represent a period of time;
  a base unit mounted to said vehicle and including a relay in said starter circuit between said ignition and said starter for immobilizing said vehicle, and a means for counting said period of time;
  said relay activates for immobilizing said vehicle only after said means for counting counts all of said period of time;
  an RF transceiver on said handheld unit and said base unit providing wireless communication between said units;
  said handheld unit transmits a signal to said base unit if said microprocessor determines that said activation code correctly corresponds to said reference code, said signal including said period of time; and
  said base unit includes flash memory, said flash memory providing a checkpoint of said period of time counted such that said checkpoint is set when said base unit loses power and counting resumes from said checkpoint when power is restored;
  a plurality of LEDs representing said period of time counted.

23. A method for immobilizing a vehicle having a starter circuit between a starter and an ignition comprising the steps of:
  generating a plurality of reference codes each representing a plurality of increments of time;
  storing said reference codes in an electronic memory;
  generating a plurality of activation codes corresponding to said reference codes;
  providing said reference codes and said activation codes to a microprocessor;
  determining by said microprocessor whether any of said activation codes corresponds to any of said reference codes;
  deleting any of said reference codes determined to correctly correspond to any of said activation codes;
  counting by an immobilization device said increments of time if said activation code is determined to correctly correspond to said reference code; and
  disabling by said immobilization device said starter circuit to prevent said ignition from activating said starter when all of said period of time has been counted.

24. The method of claim 23 wherein a predetermined grace period is added to said period of time being counted.

25. The method of claim 23 wherein said method includes the steps of sensing accessory input position as either a key in accessory position or an accessory off position and disabling the vehicle only upon sensing said key in accessory position and never during operation of said vehicle.

26. The method of claim 23 wherein said method includes the step of providing a lender with said plurality of reference codes and means to generate said corresponding activation codes.

27. The method of claim 26 wherein said method further includes the step of said lender providing said activation codes to a user and said user entering said activation code into said keypad.

28. The method of claim 27 wherein said lender selects activation codes corresponding to reference codes that represent periods of time substantially similar to loan repayment periods.

29. The method of claim 28 wherein said method includes adjusting by said immobilization device said increments to be counted to correspond to calendar months.

30. The method of claim 29 wherein said method further includes the steps of counting by said immobilization device a lapsed time between the time when all of said increments have been counted and the time that any of said activation codes is determined to correspond to any of said reference codes and subtracting said lapsed time from said increments of time represented by corresponding reference.

* * * * *